May 7, 1940.　　　　A. RONNING　　　　2,199,674
CULTIVATOR
Filed Aug. 26, 1938　　　2 Sheets-Sheet 2
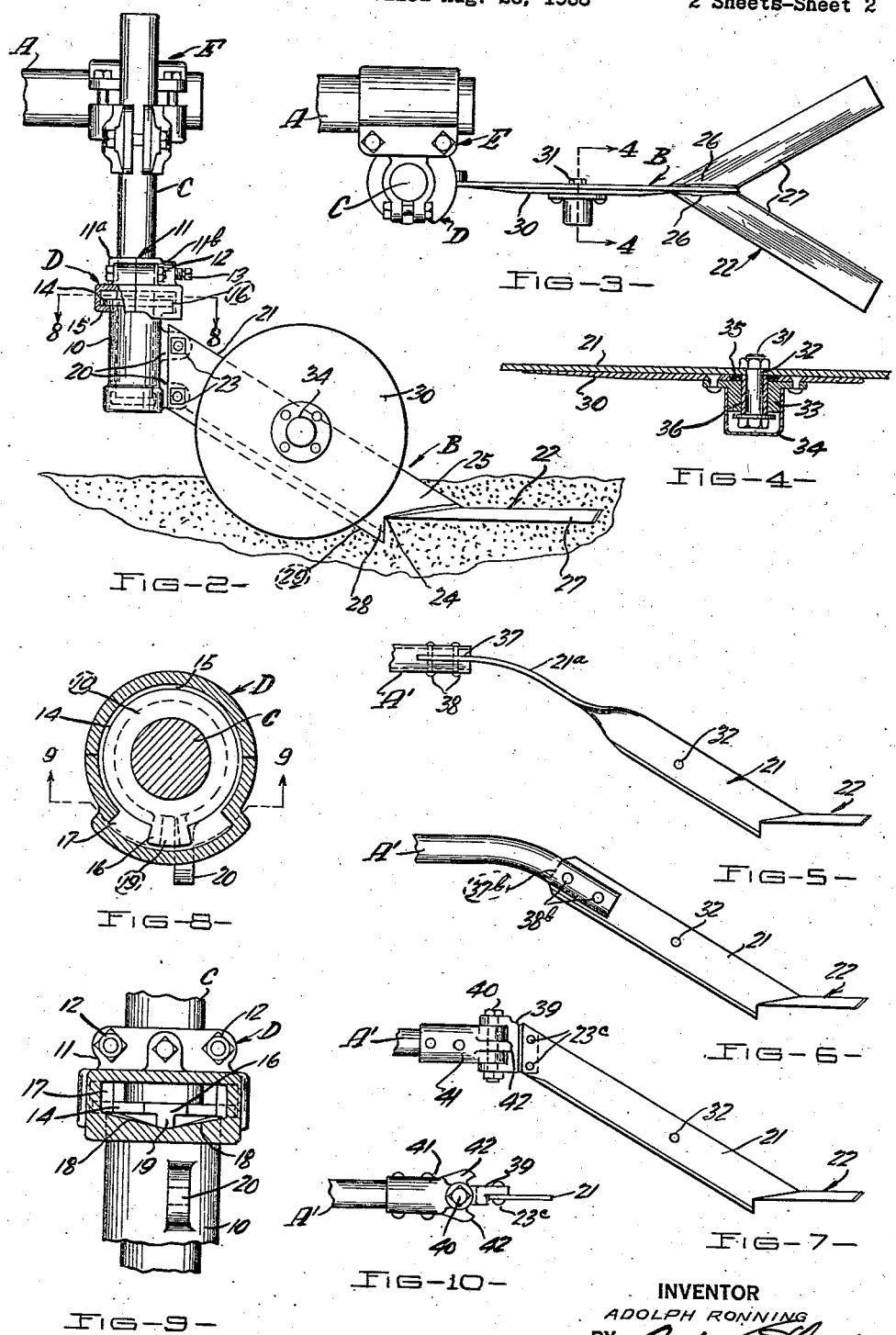
INVENTOR
ADOLPH RONNING
BY
ATTORNEY Patented May 7, 1940

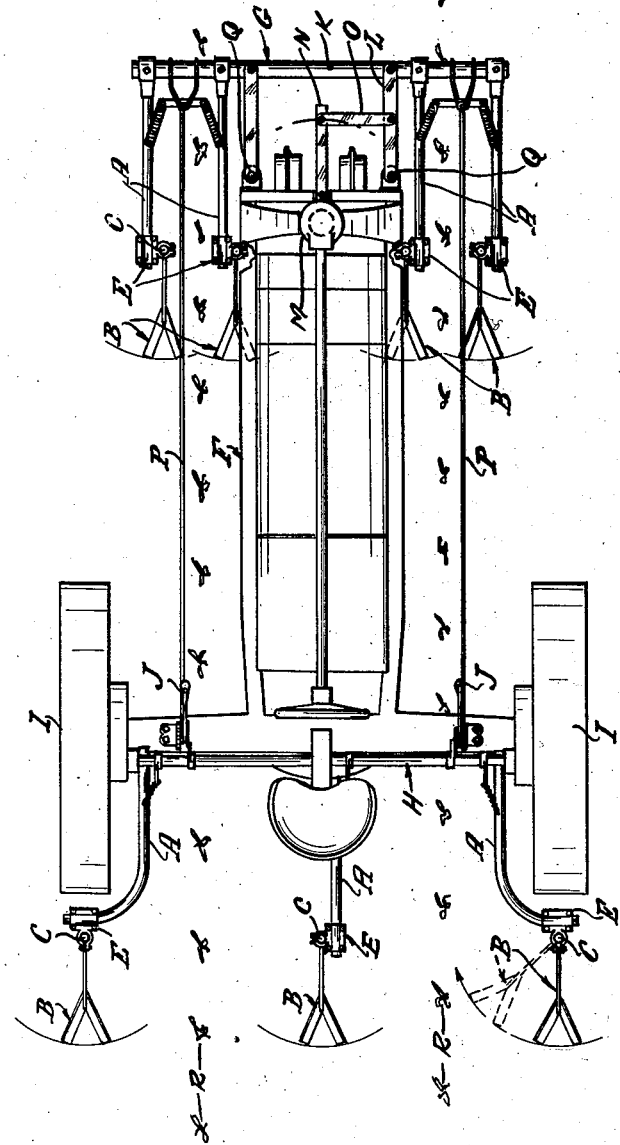
Fig-1-
Inventor
ADOLPH RONNING

2,199,674

UNITED STATES PATENT OFFICE 2,199,674

CULTIVATOR

Adolph Ronning, Minneapolis, Minn.

Application August 26, 1938, Serial No. 226,941

38 Claims. (Cl. 97—47)

This invention relates generally to improvements in tillage implements for working and cultivating the soil, and more particularly to the construction and mounting for the actual working tools or shovels of such implements.

The primary object of my invention is to provide an improved and novel mounting for the earth working tools used in surface or row crop cultivation, and which includes, as the main tool supporting element, a flat elongated blade member which is carried from the implement in a downwardly and rearwardly trailing position to enter the earth at its lower portion ahead of the point at which it is connected to the tool or shovel. The blade is set on edge vertically and by its movement through the earth acts to afford lateral stability to the tool as well as to maintain proper alignment between a series or gang of such tools. The tools are actually self aligning at all times by this arrangement, and coordinated steering as practiced in certain implements is greatly facilitated by this feature.

Another object is to provide a tool mounting by which the tool is arranged to swing on a vertical axis located forwardly of the actual ground engaging portions of the tool. In tractor cultivator assemblies this arrangement is of particular advantage in that it allows the tool to swing inwardly as a turn is made and so prevent injury to adjacent crop rows. Also, this vertically axised pivotal connection cooperates with the vertical pivots of the frontal frame mounting to greatly facilitate steering and turning operations, as will presently appear.

Another object of my invention is to provide a tool mounting including a blade set in an edgewise and trailing position as described, and which is thus self cleaning at all times and may be used with, or without, a coulter which is very conveniently mounted alongside one vertical face of the blade. The lower edge of the blade may be beveled off and sharpened on one side (opposite the coulter, if used) to further facilitate its work.

Another object is to provide an improved means for joining the tool to the blade so that a smooth and durable joint is provided and the necessity for breaker plugs is eliminated.

Another object is to provide, for an assembly of this kind, an improved coulter mounting particularly suited to my use, and which is inexpensive, durable, and entirely dust and dirt proof.

Another, and important object, is to provide in combination with the tool bar of an implement, an improved mounting assembly for connecting a tool thereto and which embodies a cam acting member effective to normally retain the tool in proper position relative to the implement and to automatically return the tool to such position after it has been raised to either side.

These and other more detailed and specific objects will be disclosed in the course of the following specification, reference being had to the accompanying drawings, in which—

Fig. 1 is a plan view of a tractor mounted cultivator mechanism embodying my invention and showing the tools in working position relative to several adjacent crop rows.

Fig. 2 is an enlarged side elevation of one of the tool units or assemblies constituting my invention, showing the tool in use and the blade equipped with a coulter.

Fig. 3 is a plan view of the assembly shown in Fig. 2.

Fig. 4 is an enlarged cross section along the line 4—4 in Fig. 3.

Figs. 5, 6, and 7 are side views of several modifications of the blade construction and mounting as used in my invention.

Fig. 8 is an enlarged horizontal cross section along the line 8—8 in Fig. 2.

Fig. 9 is a vertical cross section, partially in elevation, and taken along the line 9—9 in Fig. 8.

Fig. 10 is a fragmentary plan view of the device shown in Fig. 7.

Referring now more particularly, and by reference characters, to the drawings, A designates a draft member or a part of the implement frame to which my improved tool assembly B is to be connected by means of the vertical tool bar or post C and the coupling D. The post C is supported for adjustment both vertically and horizontally on the member A by the clamp E.

The coupling D comprises a generally tubular member or sleeve 10 which fits loosely over the lower portion of the tool post C and is retained thereon by engagement with a two-part clamp member or head 11. This clamp head 11 is made in two complementary sections 11a and 11b which may be secured together over the post by the bolts 12 and may be secured in any adjusted position vertically on the post by a set screw 13. To support the sleeve 10 I provide the same with a marginal, outwardly turned flange 14 at its upper end and which is supported by the inturned marginal lip 15 of the clamp head so that the sleeve cannot drop from the tool post but still may turn freely and have limited vertical play on the post. This flange is provided at one side with a radially extended lug 16 which plays in an arcuate recess 17 in the clamp member 11 and the lower margin or face of this recess is sloped or inclined downwardly from each end to its center, as designated at 18 in Fig. 9, in such manner that the projection 19 of the lug 16 will normally, and of its own weight, move to the center of the recess. In this position of the parts the mounting ears 20 on the sleeve 10 are turned rearwardly, and further details of the utility of this cam effect of the coupling will presently be described.

The tool assembly B, in accordance with my invention, is made up primarily of two elements, the trailing blade 21 and the tool proper or shovel 22, and which elements are connected together and carried from the coupling D by bolts 23 which secure the frontal end of the blade to the aforesaid ears 20. To best serve its purpose the blade 21 is of flat, elongated shape, set on edge vertically so that it trails rearwardly and downwardly in position to enter the ground G and travel at its lower portion therein. The rear end of the blade 21 is cut away at 24 to provide an overhanging portion or tail 25 to the lower edge of which the shovel or tool 22 is welded, as indicated at 26. As herein shown the tool 22 is substantially V-shaped with the apex turned forwardly and welded to the blades 21 while the wings or sweeps 27 extend rearwardly and substantially horizontally from the blade. A point or vane 28 of the blade extends below the level of the tool 22, to travel at all times in the ground, no matter how shallow the tool may run in the earth.

In operation, the tool 22 is supported to travel beneath the surface of the ground and cultivate the soil in the desired manner, and as clearly shown. The blade 21 travels through the ground and has a rudder effect sufficient to guide the entire assembly and, where a plurality of units are used, to maintain all in proper alignment. When the tools are lifted from the ground to transport position, the self-aligning action of the couplings D will hold the tools in alignment but, whether or not this type of coupling is used, the tools will immediately swing to proper alignment the moment the portions 28 of the blades contact the ground.

To facilitate its entrance into the ground and its travel therein, the blade 21 may have its lower edge beveled off and sharpened on one side, as at 29, and to further facilitate the operation, a rolling coulter 30 may be employed if desired. This coulter comprises the usual peripherally sharpened disk which is journaled against one side (opposite the bevel 29) of the blade 21 to which it is attached by the bearing bolt 31 which is passed through an aperture 32 in the blade, through a hub 33 of the disk, and is enclosed by a dust proof cover 34. To further prevent interference from dust, a felt washer 35 may be employed, as shown. A sleeve or bushing 36 surrounds the bolt 31 and allows it to be drawn tight without causing binding at the bearing 33.

To best illustrate the advantages and function of my improved tool mounting means or assembly attention is directed to Fig. 1 of the drawings, wherein is shown a tractor cultivator for two row cultivation. The tractor F is of conventional form and includes front and rear conventional tool mounting assemblies G and H for supporting four front, and three rear, tools B for the cultivation of two adjacent crop rows R. These mounting assemblies G and H include as a part thereof the rearwardly extended draft members A to which said tools B are connected by the vertical tool posts C and clamps E in the manner hereinbefore described, it being also understood that the tools are mounted on said posts by couplings D (not shown in this view) so that the tools may swing from vertically axised pivots. The rear assembly H includes the outer draft members A which extend rearwardly and outwardly behind the traction wheels I of the tractor and carry the tools B immediately to the rear of said wheels. The center draft member A carries the tool B at the rear medial portion of the tractor. It is understood that, in accordance with the conventional practice, the members A are movable vertically about a horizontal, transversely extended axis, and under control of hand levers J, for the purpose of lifting the tools from the earth. However, these members are rigid insofar as movement in a horizontal plane is concerned, and hitherto, with the conventional tool mounting, this has worked as a disadvantage since, in making a turn, the tools at the sides have had a tendency to work outward from the path of the wheels and frequently uproot plants of the adjacent crop rows. By virtue of my pivotal coupling and mounting D, this disadvantageous action is prevented and, as indicated in dotted lines in Fig. 1, the tools may swing to a trailing position behind the tractor wheels when a turn is made and will then clear the crop rows.

The frontal mounting assembly G includes a transversely extended and forwardly spaced beam K which is pivotally supported from the frontal frame portion of the tractor F by the arms L. The vertically axised steering post M of the tractor carries a forwardly extended beam N which is connected by a link O to the one adjacent arm L so that, as the tractor is steered, the beam K and the connected draft members A will be shifted transversely in the direction of the turn being made by the tractor. The draft members A have no movement in a horizontal plane, except as occasioned by this steering operation, but are vertically movable, under control of the levers J through the connecting rods P, for adjusting the height of the tools.

In connection with the vertically axised pivots Q, about which the horizontal shifting action of the beam K takes place, the pivotal mountings of the tools B (through my coupling elements D) has an important cooperative effect in facilitating the proper steering of the frontal tool assembly. Thus, as the tools are shifted to either side (about axis Q) the tools, instead of having a tendency to drag angularly and injure adjacent crop rows as was the case with rigidly mounted tools, will assume an angular trailing position allowing them to clear the rows, and at the same time will greatly facilitate the actual steering operation, since there will be no tendency of the tools to drag laterally on the ground. To the best of my knowledge, the use of two vertically axised pivots in the tool mounting between the tool and the supporting frame, is entirely new.

In lieu of the coupling D, I may employ any other suitable mounting means, and several of these are shown in Figs. 5, 6, 7, and 10. In each case the blade and tool are basically identical to the corresponding elements heretofore described, and are indicated at 21 and 22 respectively. In each case also a tool bar A' is provided, and the same may be, in reality, simply the rear extremity of the beam A previously described.

In Fig. 5 the extended frontal end of the blade 21 (which is in this case made of spring steel) is twisted on its axis through ninety degrees to provide a mounting portion 21a which extends arcuately and forwardly into a slot 37 cut in the bar A' wherein it is secured by rivets or bolts 38. This arrangement provides for a yieldable, downward pressure on the tool 22 due to the resiliency afforded by the horizontally turned frontal end of the spring steel blade.

In Fig. 6 the blade 21 is riveted or bolted at 38b in a vertical slot 37b formed in the rear end of the bar A', and in this case the rear end of the bar is turned angularly downwardly and rearwardly to extend in alignment with the blade itself.

In Figs. 7 and 10 the upper, frontal end of the blade 21 is secured at 23c to a movable yoke or hinge tang 39 which is swiveled on a vertically axised bolt 40 extended through a coupling 41 secured to the rear end of the bar A'. The blade and tool assembly may thus swing in a horizontal plane, and this motion is limited by contact of the yoke 39 with stop lugs 42 extended from the coupling.

The operation of the foregoing modified structures is, of course, quite similar to that heretofore described. In each case the blades 21 are provided with the apertures 32 for mounting the coulter, when used. The particular mountings and blade constructions may be used with tools or shovels of any desired form, and will greatly facilitate the use and operation thereof.

It may particularly be noted that the angle of the cutting edge of each blade 21 is so sharp with respect to the ground surface that the edge will in effect cut or slice downwardly into the soil and vegetable matter and will thereby also prevent the accumulation of roots, weeds, trash, etc., on the blade as would obviously occur were the edge disposed at a more perpendicular angle with reference to the horizontal.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In combination with a draft device, an earth working tool assembly comprising a forwardly inclined blade member pivotally attached to the draft device and trailing therefrom to enter and move through the earth, and a tool secured to the blade member for working the earth.

2. In combination with a draft device, an earth working tool assembly comprising a forwardly inclined, longitudinally extending blade member pivotally secured in trailing position to the draft device to enter the earth adjacent its rear end, and an earth working tool secured to the rear end of the blade member.

3. An earth working tool assembly comprising a draft device, a blade member set vertically on edge and secured to the draft device in a downwardly and rearwardly trailing position for entering the earth at its rear lower end, and an earth working tool secured to the rear end of the blade member, and a coulter disk mounted alongside the blade member forwardly of the tool.

4. In combination with a draft device, a yoke member pivotally mounted on the device for oscillating movement in a horizontal plane, a blade secured to the yoke member and extended therefrom in downwardly trailing position and set vertically edgewise for entering the earth at its rear end portion, and a tool secured to and carried by the rear end of the blade.

5. In combination with a draft device, a vertically axised pivot member carried by said draft device, a yoke member pivotally mounted on the said pivot member for oscillating movement in a horizontal plane, stop members for contact with the yoke member for limiting the movement thereof, a blade secured to the yoke member and extended therefrom in downwardly trailing position and set vertically edgewise for entering the earth at its rear end portion, and a tool secured to the rear end of the blade.

6. An earth working tool assembly comprising a vertical tool post, a coupling swiveled thereon, a blade extended in trailing position from the coupling and disposed in a vertical plane for entering the earth edgewise at its lower portion, an earth working tool secured to the blade, means for raising and lowering the blade and tool, and means at the coupling for controlling the position of the blade when raised from trailing position.

7. An earth working tool assembly comprising a vertical tool post, a coupling thereon, a blade extended in trailing position from the coupling for entering the earth edgewise at its lower portion, an earth working tool secured to the blade, the said coupling comprising a sleeve journaled on the post for supporting the blade for movement in a horizontal plane, and a two-part head member adjustably secured to the post and having rotatable connection with the sleeve for retaining the same on the post.

8. An earth working tool assembly comprising a vertical tool post, a coupling thereon, a blade extended in trailing position from the coupling for entering the earth edgwise at its lower portion, an earth working tool secured to the blade, the said coupling comprising a sleeve journaled on the post and supporting the blade for oscillating movement in a horizontal plane, a flange on the sleeve, a head member clamped to the post and having a lip supporting the said flange, a lug extended from the sleeve, and the said head member having an arcuate recess for the reception of the lug, and the lower face of the recess being inclined downwardly from the ends to the center for maintaining the sleeve and blade in an adjusted position by cam action of the lug in the said recess.

9. In combination with a blade member set on edge vertically and forming a part of an earth working tool, a coulter and mounting comprising a coulter disk disposed alongside the blade member, a hub on the coulter disk, a bolt passed through the hub and the blade member, the said disk having a recess adjacent the bolt and clearing the same, a felt washer secured in said recess, a bushing extended through the hub for receiving the said bolt, and a dust proof cover secured over the hub and bolt.

10. A mounting for an earth working tool, comprising a vertical tool post, a coupling sleeve journaled on the post, a tool extended rearwardly from the sleeve, a head member adjustably mounted on the post and having connection with the sleeve for retaining the same on the post, the said head member also having an arcuate recess with a lower face inclined from each end downwardly toward the center, and a lug member extended from the sleeve for movement in the recess and bearing upon the lower face thereof for normally centering itself in the recess and retaining the sleeve in an operative position.

11. In a cultivator, a draft device, an earth working tool, and a coupling for connecting the tool and the draft device, the said coupling pivotally supporting the tool for movement about a vertical axis, and the said coupling including cam acting faces cooperating with the tool for normally retaining the tool in a predetermined, horizontal position with respect to its pivotal axis.

12. In a cultivator, a draft element, a member pivotally secured at its forward end to said element and extending rearwardly therefrom to support a cultivator tool at its rear and whereby such tool may trail behind and with respect to the pivot connection of the member to the draft element, said member having an upwardly and forwardly sloped cutting edge at its under side, and the inclination of which edge is disposed at decidedly less than a right angle with respect to the horizontal.

13. In a cultivator, a supporting frame, a member pivoted at its forward end to the frame for movement about a vertical axis and extending rearwardly and downwardly from the pivot at a sharp angle to the ground surface, the underside of said member being provided with a cutting edge for penetrating the ground at such sharp angle, and a cultivator tool carried by and at the lower end of the member.

14. A wheel supported main frame, an elongated tool shank pivoted at its forward end with respect to the main frame for relative transverse movement at its rear, a cultivator tool at the rear end of the blade, said shank having a sharply inclined edge for cutting into the ground in advance of the cultivator tool.

15. A wheel supported main frame, an elongated tool shank pivoted at its forward end with respect to the main frame for relative transverse movement at its rear, a cultivator tool at the rear end of the blade, means for raising and lowering the tool with respect to the frame, said shank extending forwardly and upwardly from the tool to open the ground surface in advance of the tool.

16. The combination with a vehicle frame, of a blade member pivotally connected at its forward end to the frame in a manner permitting the rear end to swing transversely and to trail behind the pivot connection with the frame, said blade having a forwardly inclined cutting edge adapted to cut into the surface of the soil at a sharp angle thereto, and a cultivator tool secured to the rear end of the blade for operation in the ground rearwardly of the blade.

17. The combination with a vehicle frame, of a blade member pivotally connected at its forward end to the frame in a manner permitting the rear end to swing transversely and to trail behind the pivot connection with the frame, said blade having a forwardly inclined cutting edge adapted to cut into the surface of the soil at a sharp angle thereto, means for vertically adjusting the blade with respect to the frame, and a cultivator tool attached to the rear end of the blade.

18. The combination with a vehicle frame, of a blade member pivotally connected at its forward end to the frame in a manner permitting the rear end to swing transversely and to trail behind the pivot connection with the frame, said blade having a forwardly inclined cutting edge adapted to cut into the surface of the soil at a sharp angle thereto, a cultivator tool at the rear of the blade, and means for adjusting the blade longitudinally with respect to the vehicle frame.

19. The combination with a vehicle frame, of a blade member pivotally connected at its forward end to the frame in a manner permitting the rear end to swing transversely and to trail behind the pivot connection with the frame, said blade having a forwardly inclined cutting edge adapted to cut into the surface of the soil at a sharp angle thereto, means for transversely shifting the blade with respect to the frame, and an earth working tool at the rear end of the blade.

20. The combination with a vehicle frame, of a cultivating device secured to the frame and for vertical adjustment with respect thereto, said device comprising a blade disposed in a longitudinally vertical plane and having a forwardly inclined under edge disposed at a sharp slicing angle with respect to the ground surface, and a rolling coulter attached to one side of the blade to cooperate therewith in opening the ground.

21. The combination with a vehicle frame, of a cultivating device secured to the frame and for vertical adjustment with respect thereto, said device comprising a blade disposed in a longitudinal vertical plane and having a forwardly inclined under edge disposed at a sharp slicing angle with respect to the ground surface, and a rolling coulter attached to one side of the blade, said blade and coulter having inwardly beveled shearing edges which cooperate to slice open the ground as the vehicle moves forwardly.

22. The combination with a vehicle frame, of a cultivating device secured to the frame and for vertical adjustment with respect thereto, said device comprising a blade disposed in a longitudinal vertical plane and having a forwardly inclined under edge disposed at a sharp slicing angle with respect to the ground surface, and a rolling coulter attached to one side of the blade to cooperate therewith in opening the ground, said cultivating device having a vertically axised pivot joint forwardly of the blade that will permit the blade and coulter to trail therebehind and move transversely with respect to the frame.

23. The combination with a vehicle frame, of a cultivator unit adjustably secured to the frame so that it may be lowered with respect thereto into ground engaging position and raised with respect to the frame out of such position, said unit being pivoted at its forward end, with respect to the frame, whereby its rear end may trail freely behind the pivot axis when in ground engagement and means operative upon raising the unit with respect to the frame and from the ground for aligning it with the normal direction of travel.

24. The combination with a vehicle frame, of a tool support vertically adjustable with respect to the frame, a cultivator unit pivotally secured at its front end to the support so that its rear end may trail therebehind, and means on the support for engaging the unit to prevent such pivoting action when the unit is lifted out of engagement with the ground.

25. The combination with a vehicle frame, of a transversely shiftable tool support mounted on the frame, a cultivator unit pivoted at its forward end to the support so that its rear end is free to trail in the soil behind the pivot connection, and means for raising the support with respect to the frame to lift the cultivator unit out of the soil.

26. The combination with a vehicle frame, of a vertically adjustable and transversely shiftable tool support, a cultivator unit connected at its forward end by a vertically axised pivot to the support thus permitting its rear end to trail with respect to the support, said pivot connection being operative to lift the unit out of engagement with the soil when the support is raised.

27. The combination with a vehicle frame, of a vertically adjustable and transversely shiftable tool support, a cultivator unit connected at its forward end by a vertically axised pivot to the support thus permitting its rear end to trail with respect to the support, said pivot connection being operative to lift the unit out of engagement with the soil when the support is raised, and means operative upon lifting the unit to hold it against swinging action about said pivot.

28. The combination with a vehicle frame, of a tool beam pivotally connected at its forward end to the frame for movement in a longitudinal vertical plane, means for lowering and raising the beam, and a cultivator unit carried by the beam so as to be vertically adjustable therewith, said unit having freedom for transverse shifting movement with respect to the beam, when in engagement with the soil.

29. The combination with a vehicle frame, of a tool beam pivotally connected at its forward end to the frame for movement in a longitudinal vertical plane, means for lowering and raising the beam, and a cultivator unit carried by the beam so as to be vertically adjustable therewith, said unit including a member pivoted to the beam for movement about a vertical axis and having a cultivator tool disposed rearwardly of said axis whereby it may trail in the soil therebehind.

30. The combination with a vehicle frame, of a transversely shiftable tool beam mounted thereon, tool bars extending rearwardly from the beam and with their rear ends vertically movable about an axis coincident with the beam, cultivator tools extending rearwardly from the bars and pivotally connected thereto with freedom for trailing action therebehind, and means for lifting the rear ends of the bars to raise the tools out of contact with the ground.

31. The combination with a vehicle frame, of a transversely shiftable tool beam mounted thereon, tool bars extending rearwardly from the beam and with their rear ends vertically movable about an axis coincident with the beam, cultivator tools extending rearwardly from the bars and pivotally connected thereto with freedom for trailing action therebehind, means for lifting the rear ends of the bars, and means operating through said pivotal connections to raise the tools with the bars.

32. The combination with a vehicle frame, of a transversely shiftable tool beam mounted thereon, tool bars extending rearwardly from the beam and with their rear ends vertically movable about an axis coincident with the beam, cultivator tools extending rearwardly from the bars and pivotally connected thereto with freedom for trailing action therebehind, means for lifting the bars to raise the tools, and means operative upon lifting the bars to align the tools on their pivot connections with the direction of travel.

33. The combination with a vehicle frame, of a transversely shiftable tool beam mounted thereon, tool bars extending rearwardly from the beam and with their rear ends vertically movable about an axis coincident with the beam, cultivator tools extending rearwardly from the bars and pivotally connected thereto with freedom for trailing action therebehind, means for limiting the transverse swinging movement of the tools on said pivotal connection, and means for lifting the rear ends of the bars, to raise the tools out of contact with the ground.

34. The combination with a vehicle frame, of a series of transversely spaced posts mounted on the frame, means for simultaneously raising and lowering the posts with respect to the frame, and cultivator tools carried by the posts for vertical movement therewith but having freedom for transverse movement about the posts.

35. The combination with a vehicle frame, of a series of transversely spaced posts mounted on the frame, means for simultaneously raising and lowering the posts about a transverse axis in advance thereof, and cultivator tools pivotally connected to the posts for trailing action therebehind, said tools being raised and lowered in conjunction with the posts.

36. The combination with a vehicle frame, of a series of transversely spaced posts mounted on the frame, means for simultaneously raising and lowering the posts about a transverse axis in advance thereof, and cultivator tools pivotally connected to the posts for trailing action therebehind, said tools being raised and lowered in conjunction with the posts, and means for transversely shifting the posts with respect to the frame to guide said trailing tools when in operation in the soil.

37. In a tractor-cultivator, a transversely extending tool beam supported from the tractor by a pair of generally fore and aft extending links whereby the beam may be shifted transversely with such links and about the pivot connections of the links to the tractor, vertically adjustable members attached to the beam, tools pivotally attached to said members for trailing movement therebehind, and means for raising the adjustable members to thereby also raise the tools.

38. In a tractor-cultivator, a transversely extending tool beam supported from the tractor by a pair of generally fore and aft extending links whereby the beam may be shifted transversely with such links and about the pivot connections of the links to the tractor, vertically adjustable members attached to the beam, tools pivotally attached to said members for trailing movement therebehind, means for lifting the adjustable members to raise the tools, and means connected with the steering mechanism of the tractor to transversely shift the link supported tool beam.

ADOLPH RONNING.